J. M. GILSTRAP.
STEERING GEAR FOR VEHICLES.
APPLICATION FILED JUNE 21, 1910.
1,024,505.
Patented Apr. 30, 1912.
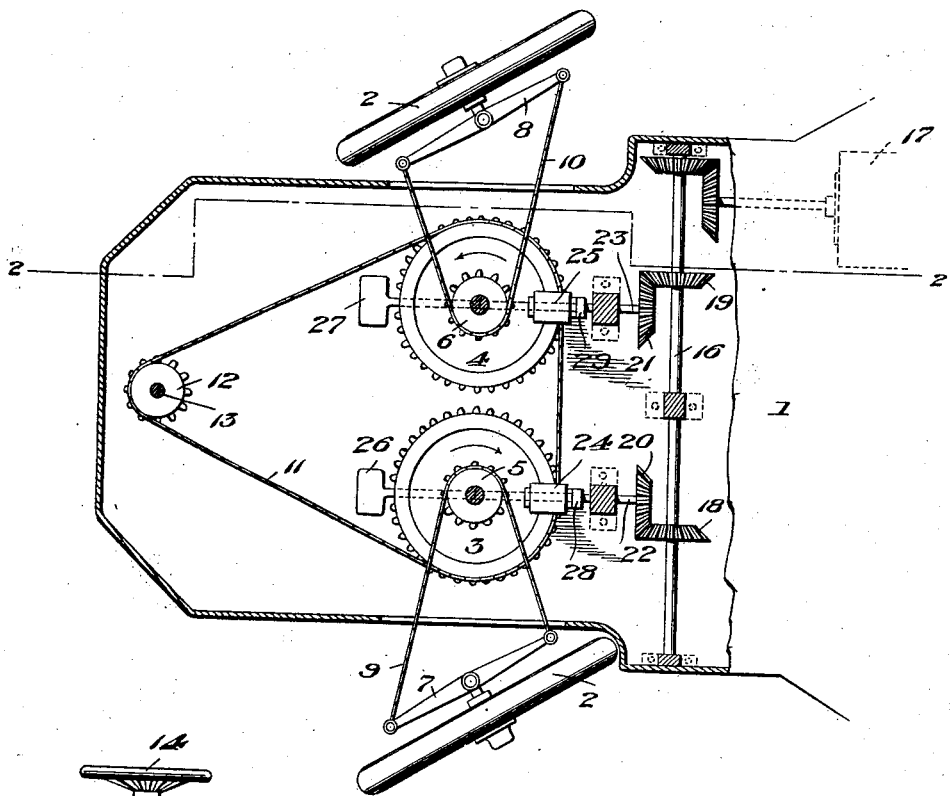
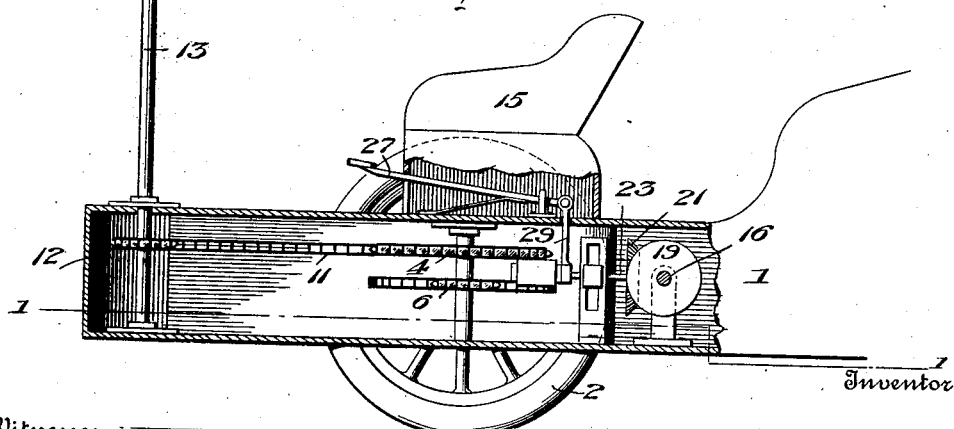
COLUMBIA PLANOGRAPH CO., WASHINGTON, D. C.

UNITED STATES PATENT OFFICE.

JAMES M. GILSTRAP, OF FRESNO, CALIFORNIA.

STEERING-GEAR FOR VEHICLES.

1,024,505.

Specification of Letters Patent. Patented Apr. 30, 1912.

Application filed June 21, 1910. Serial No. 568,197.

*To all whom it may concern:*

Be it known that I, JAMES M. GILSTRAP, a citizen of the United States, residing at Fresno, county of Fresno, and State of California, have invented certain new and useful Improvements in Steering-Gear for Vehicles of All Kinds, of which the following is a specification.

This invention relates to steering gear for vehicles of all kinds.

The present invention has for its objects the provision of a novel steering gear adapted for use on either horse or motor propelled vehicles of all kinds and constructed and adapted for steering by hand or by power, and to this end the invention consists, in one aspect, of coöperatively related wheels having operative connections with the ground steering wheels of the vehicle and associated with a hand steering wheel, and in another aspect, of coöperatively related wheels operatively connected to the ground steering wheels of the vehicle and power driven means having controlling devices, whereby, according to manipulation, the ground steering wheels of the vehicle will be turned in one direction or the other by the utilization of power derived from the propelling agency of the vehicle, or other source.

The invention is set forth fully hereinafter and the novel features are recited in the appended claim.

In the accompanying drawings:—Figure 1 is a bottom view with the vehicle body in section; and Fig. 2, a side elevation with the body in section.

The vehicle 1 is provided with ground steering wheels 2 of the usual pivoted arrangement. Mounted in suitable bearings on the vehicle 1 are sprocket or other wheels 3 and 4, which are, respectively, provided with smaller sprocket or other wheels 5 and 6, in turn operatively connected to arms 7 and 8 of the brackets which carry the wheels 2, these connections in the present instance being sprocket chains 9 and 10 run around the sprocket wheels 5 and 6, respectively. It will be understood that the wheels 3, 4, 5 and 6 are not necessarily sprocket wheels and that other operating connections than those shown at 9 and 10 may be employed.

A sprocket chain or other connection 11 passes around the wheels 3 and 4 and also around another wheel 12. In order that the invention may be adapted for hand steering, as for instance on vehicles which have no self-contained propelling power, the wheel 12 is preferably carried by the stem 13 which has a hand steering wheel 14 which may be grasped by the occupant of the driver's seat 15.

At 16 there is a shaft which may be driven by power in any preferred manner, as for instance, by the motor, shown diagrammatically at 17, that is used to propel the vehicle, said shaft carrying gears 18 and 19 which, respectively, mesh with gears 20 and 21 on shafts 22 and 23 mounted in bearings permitting their forward ends to rise and fall. The shafts 22 and 23 carry friction or other wheels 24 and 25 which, respectively, are adapted to bear against the lower faces of the wheels 3 and 4.

There are two spring actuated pedals or foot levers 26 and 27, respectively, connected to the shafts 22 and 23 by the rods 28 and 29. Normally the springs hold the pedal levers 26 raised and the wheels 24 and 25 out of engagement with the wheels 3 and 4. If it is desired to turn the vehicle in one direction or the other, the driver depresses either the lever 26 or lever 27, thereupon throwing the given friction wheel 24 or 25 against wheel 3 or wheel 4, and rotating said wheels so that the ground steering wheel 2 will be turned in the desired direction, thereby utilizing power to steer the vehicle. The power and hand steering mechanisms may be used separately or together.

Having thus described my invention, what I claim as new and desire to secure by Letters Patent, is:—

In a steering gear for vehicles, the combination with ground steering wheels, of independent wheels having an operative connection with each other, operative connections between the respective independent wheels and the respective ground wheels, whereby all of said wheels will turn in unison, bodily shiftable power-operated shafts, wheels carried by the respective shafts adapted, respectively, to engage the independent wheels aforesaid, and pivoted levers respectively operatively connected to the respective power-operated shafts aforesaid, whereby either of the power driven wheels may be engaged with one of the independent wheels aforesaid, said driving wheels being adapted to turn in opposite directions.

In testimony whereof, I hereunto affix my signature in presence of two witnesses.

JAMES M. GILSTRAP.

Witnesses:
J. S. DRURY,
ARTHUR H. DREW.

Copies of this patent may be obtained for five cents each, by addressing the "Commissioner of Patents, Washington, D. C."